United States Patent [19]

Huber et al.

[11] Patent Number: 4,792,030
[45] Date of Patent: Dec. 20, 1988

[54] HUB FOR CLUTCH DISCS OF FRICTION CLUTCHES IN MOTOR VEHICLES

[75] Inventors: Lothar Huber, Bühl; Hermann Langeneckert, Appenweier, both of Fed. Rep. of Germany

[73] Assignee: Luk Lamellen und Kupplungsbau GmbH, Bühl, Fed. Rep. of Germany

[21] Appl. No.: 38,432

[22] Filed: Apr. 15, 1987

Related U.S. Application Data

[63] Continuation of Ser. No. 825,460, Feb. 3, 1986, abandoned.

[51] Int. Cl.$^4$ ................................................. F16D 3/14
[52] U.S. Cl. ............................... 192/106.2; 192/70.17
[58] Field of Search ............... 192/106.1, 106.2, 70.16, 192/70.17, 70.18

[56] References Cited

U.S. PATENT DOCUMENTS

| | | | |
|---|---|---|---|
| 4,044,873 | 8/1977 | Parsons et al. | 192/106.2 |
| 4,060,007 | 11/1977 | Levesque | 192/67 R |
| 4,416,564 | 11/1983 | Billet et al. | 192/106.2 X |
| 4,418,812 | 12/1983 | Lech, Jr. | 192/106.2 |
| 4,433,771 | 2/1984 | Caray | 192/70.17 X |
| 4,501,348 | 2/1985 | Lutz et al. | 192/106.1 |
| 4,556,135 | 12/1985 | Loizeau | 192/106.2 |
| 4,556,136 | 12/1985 | Lech, Jr. | 192/70.17 X |

Primary Examiner—David A. Scherbel
Assistant Examiner—Creighton Smith
Attorney, Agent, or Firm—Peter K. Kontler

[57] ABSTRACT

One or both end faces of the flange of the hub in a clutch disc have radially or nearly radially extending teeth which are caused to penetrate into adjacent shoulders of the sleeve-like other component of the hub so that the flange and the sleeve-like component are compelled to rotate as a unit. At least one of the shoulders is formed by upsetting the corresponding portion of the sleeve-like component.

23 Claims, 4 Drawing Sheets

HUB FOR CLUTCH DISCS OF FRICTION CLUTCHES IN MOTOR VEHICLES

This application is a continuation of application Ser. No. 825,460, filed Feb. 3, 1986, now abandoned.

BACKGROUND OF THE INVENTION

The invention relates to hubs and other types of rotary elements, especially to improvements in elements which can be used as hubs of clutch discs in friction clutches for motor vehicles. More particularly, the invention relates to improvements in composite structural elements wherein an annular component is held in a selected axial position on a male component as a result of deformation of a portion of the male component.

French Pat. No. 1,096,443 discloses a two-piece hub for use in the clutch disc of a friction clutch. The male component of the hub is a sleeve which extends through the central opening of a female component constituting a flange wherein the opening is surrounded by a surface having axially parallel teeth that penetrate into the material at the periphery of the sleeve so as to remove shavings and to form in the peripheral surface tooth spaces flanked by surfaces which cooperate with the teeth to transmit torque from the flange to the sleeve when the clutch disc is in use. Prior to slipping the flange onto the sleeve, the diameter of the peripheral surface of the sleeve matches the diameter of the root circle of the annulus of teeth on the flange. The hardness of teeth exceeds the hardness of the material along the peripheral surface of the sleeve so that the teeth act not unlike material removing tools and cut their way into the material of the sleeve as a result of penetration of the sleeve into and through the flange. The sleeve has an external shoulder which acts as an abutment and determines the final axial position of the flange which is thereupon fixed in such position as a result of upsetting of a portion of the material of the sleeve at that axial end of the flange which is remote from the shoulder. A washer is disposed between the flange and the upset portion of the sleeve.

The just described hub is expensive because the internal teeth of the flange must be machined with a high degree of precision so that their root diameter matches the diameter of the peripheral surface of the sleeve. Accurate machining of internal teeth is necessary on the additional ground that this ensures predictable removal of shavings from the periphery of the sleeve during axial movement of the flange toward the shoulder of the sleeve. The diameter of the peripheral surface of the sleeve should not exceed the root diameter of the annulus of internal teeth in the flange because this would entail the development of pronounced radial stresses between the flanges and the sleeve, i.e., the sleeve would tend to expand the flange radially. The peripheral surface of the sleeve also requires a rather expensive treatment. Still further, the shoulder of the sleeve must be provided with a chamber for reception of shavings which are removed from the periphery of the sleeve during axial advancement of the flange toward the shoulder.

A further drawback of the patented hub is that some material of the sleeve penetrates into the adjacent end portions of tooth spaces between the internal teeth of the flange during upsetting of a portion of the sleeve in order to fix the flange in the selected axial position (in which the flange abuts against the shoulder). That material of the upset portion which has penetrated into the tooth spaces tends to expand the flange, and the thus generated forces are superimposed upon the forces which develop as a result of axial movement of the flange toward the stop and concomitant penetration of some material of the sleeve into the aforementioned tooth spaces. The material in the tooth spaces forms a plurality of wedges which apply to the teeth radial stresses and thereby prevent the teeth from transmitting a substantial torque. Furthermore, and unless the peripheral surface of the sleeve and the teeth of the flange are machined with a very high degree of precision, a combination of tolerances in the finish of the peripheral surface and in the finish of internal teeth can entail the development of hairline cracks in the regions of internal teeth while the flange is forcibly advanced toward the external shoulder of the sleeve. Such cracks must be detected and the corresponding hubs must be discarded in order not the affect the reliability of the clutch disc. It must be borne in mind that the flange of the hub in the clutch disc of a friction clutch is formed with several windows for customary coil springs which oppose limited angular movement of the hub with reference to the customary disc-shaped carrier of friction linings. Since the friction clutch should occupy a small amount of space in a motor vehicle, the clutch disc is normally a relatively small constituent of the clutch so that the windows of the flange are placed close to the periphery of the sleeve. In other words, the webs between the windows and the internal teeth of the flange (as measured radially of the clutch disc) are relatively narrow so that the development of cracks in the region of the teeth (as a result of penetration of material into the tooth spaces) unduly weakens the flange and necessitates discarding of the assembled hub.

OBJECTS AND SUMMARY OF THE INVENTION

An object of the invention is to provide a novel and improved composite structural element wherein a male component extends through a female component and a part of the male component is upset to hold the female component in a predetermined axial position, and to provide such structural element with novel and improved means for transmitting torque between the male and female components without the generation of excessive radially oriented stresses and without the need for accurate machining of either component.

Another object of the invention is to provide a relatively simple, compact and inexpensive structural element of the above outlined character which can be used with particular advantage in the clutch disc of a friction clutch for motor vehicles and the like.

A further object of the invention is to provide a novel and improved method of assembling the components of the structural element.

An additional object of the invention is to provide a novel and improved apparatus for assembling the male and female components of the structural element.

Still another object of the invention is to provide a structural element wherein one of the components need not remove shavings and/or otherwise configurated fragments of material from the other component during assembly of such components and/or during upsetting of the male component.

A further object of the invention is to provide a structural element which can be mass produced with a small fraction of rejects which are unavoidable in connection with the making of conventional structural elements.

Another object of the invention is to provide a structural element which can be used in existing friction clutches or other devices as a superior and longer-lasting substitute for heretofore known structural elements.

A further object of the invention is to provide a clutch disc which embodies the above outlined structural element.

The invention is embodied in a composite structural element which can be used with particular advantage as a hub in the clutch disc of the friction clutch in a motor vehicle. The improved element comprises an annular female component which preferably resembles or constitutes a flange and a preferably tubular male component which extends through the female component and has first and second shoulders flanking the female component. The male component includes at least one upset portion which defines one of the shoulders and is obtained by shifting some material of the male component axially of the female component, e.g., after the female component abuts against the other shoulder. The improved structural element further comprises novel and improved means for transmitting torque between the male and female components. Such torque transmitting means comprises protuberances provided on at least one of the components and extending substantially radially of the female component, and the other component has sockets for the protuberances of the one component.

The protuberances can include or constitute teeth, e.g., so-called Hirth-type serrations.

The female component has a central opening for the male component, and the protuberances can be provided on the female component adjacent to the opening; such protuberances can constitute a complete annulus of equally spaced teeth.

The female component has first and second end faces which are respectively adjacent to the first and second shoulders of the male component, and the protuberances can be provided in one or both end faces of the female component.

The one shoulder is adjacent to the one end face and the upset portion is formed with complementary protuberances mating with the protuberances of the female component and defining the aformentioned sockets. The protuberances of the female component define sockets for the protuberances of the upset portion of the male component. The complementary protuberances can be formed as a result of penetration of the female component (and more particularly of the protuberances of the female component) into the material of the male component during upsetting of the aforementioned portion of the male component.

The first component can include first and second upset portions which respectively define the first and second shoulders. The protuberances can be provided in the first shoulder and the upset portion can define the second shoulder of the male component.

In accordance with one presently preferred embodiment of the invention, the protuberances include prefabricated first protuberances provided in the first end face of the female component and mating with second protuberances provided in the first shoulder of the male component. The second protuberances define sockets for the first protuberances and vice versa, and the protuberances of the torque transmitting means further include third protuberances provided in the second end face of the female component and fourth protuberances provided in the second shoulder and mating with the third protuberances. The fourth protuberances provide sockets (e.g., tooth spaces) for the third protuberances, and vice versa. The third protuberances can be prefabricated and can be used to form the fourth protuberances as a result of their penetration into the material of the male component at the second shoulder.

The protuberances have ridges (such as the top lands of teeth) which can make with the axis of the female component angles of between 60-85 degrees, preferably 70-80 degrees and most preferably approximately or exactly 75 degrees.

One of the shoulders can constitute the frustum of a cone and the projections or the sockets can be provided in such one shoulder. The vertex angle of the cone is preferably between 160 and 179 degrees, most preferably in the region of or exactly 170 degrees. The vertex of the cone can be located on the axis of the female component.

The elongated protuberances can extend exactly radially of the female component. Alternatively, at least some of the protuberances can extend tangentially of a circle whose center is located on the axis of the female component (i.e., the imaginary extensions of such inclined protuberances bypass the axis of the female component). The components are arranged to rotate in a predetermined direction (e.g, in a direction to transmit torque from the crankshaft to the change-speed transmission when the friction clutch embodying the improved structural element is installed in a motor vehicle), and the radially outermost portion of each inclined protuberance is preferably located ahead of the radially innermost portion of the respective protuberance, as considered in the direction of rotation of the male and female components.

The material of one of the components (preferably the female component) is preferably harder than the material of the other component, at least in the region of the protuberances, so that the protuberances can readily penetrate into the material of the other component in response to axial movement of the two components relative to each other.

The novel features which are considered as characteristic of the invention are set forth in particular in the appended claims. The improved structural element itself, however, both as to its construction and the mode of assembling its components, together with additional features and advantages thereof, will be best understood upon perusal of the following detailed description of certain specific embodiments with reference to the accompanying drawing.

DESCRIPTION OF THE PREFERRED EMBODIMENTS

Figure 1:
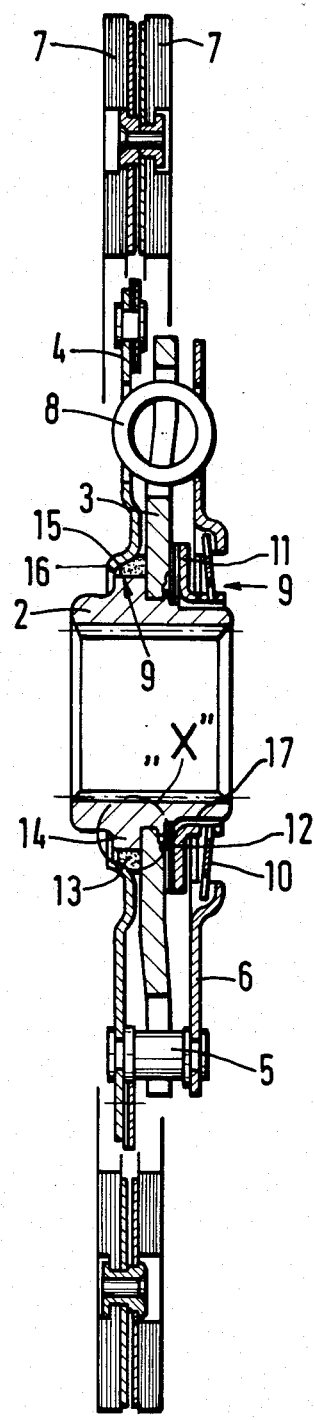
FIG. 1 is an axial sectional view of a clutch disc including a hub constituting a structural element which embodies one form of the invention.

FIG. 1 shows a clutch disc 1 which comprises a composite hub including a male component 2 in the form of a short tube having internal teeth adapted to mate with the external teeth of the input shaft of the change-speed transmission in a motor vehicle, and a female component 3 in the form of an annular flange which surrounds a cylindrical intermediate portion of the male component 2. The composite hub including the components 2 and 3 constitutes a structural element which is constructed in accordance with a first embodiment of the invention and the details of which are shown in FIGS. 2 to 5.

The female component 3 (hereinafter called flange for short) is flanked by a disc-shaped carrier 4 for two friction linings 7 and by a second disc-shaped member 6. The carrier 4 and the disc-shaped member 6 are ridigly secured to each other by distancing elements in the form of rivets 5. The linings 7 are disposed between the clutch plate and the flywheel of a friction clutch which serves to transmit torque from the engine-driven crankshaft to the input shaft of the aformentioned transmission in a motor vehicle. The parts 4, 5, 6 and 7 can turn (within limits) relative to the structural element 2, 3 against the opposition of a set of energy storing elements in the form of coil springs 8 (only one shown in FIG. 1) which are installed in suitable windows of the flange 3 on the one hand and of the carrier 4 and member 6 on the other hand. The means for opposing rotation of the parts 4–7 relative to the components 2–3 further includes a friction generating device 9 which can be similar with or identical to one of those disclosed in commonly owned U.S. Pat. No. 4,548,309 granted Oct. 22, 1985 to Helmut Braun for "Clutch plate for use in friction clutches of motor vehicles and the like".

The friction generating device 9 comprises an energy storing member 10 in the form of a diaphragm spring whose radially outermost portion reacts against the radially innermost portion of the disc-shaped member 6 and whose radially innermost portion bears against the axially extending portion of a pressure transmitting member 11. The latter further includes a radially extending washer-like portion serving to urge a friction washer 12 against the respective end face of the flange 3.

The friction generating device 9 further comprises a specially configured friction ring 13 (see FIG. 1 of the aformentioned patent to Braun) which surrounds a ring-shaped external collar 14 of the male component 2 (hereinafter called sleeve). The friction ring 13 has a frustoconical external surface 15 which bears against a complementary surface at the inner side of a hollow frustoconical centering portion 16 of the carrier 4.

Referring to FIGS. 2 to 5, the flange 3 has two end faces 19 and 25 which are respectively adjacent to radially extending shoulders 2a and 22 of the collar 2. Actually, the shoulder 2a abuts against a recessed portion 20a of the end face 19, and such shoulder is defined by an upset collar-like annular portion 17 of the sleeve 2. The other shoulder 22 is defined by a collar-like annular portion 21 of the sleeve 2. The reference character 17a denotes in FIG. 2 that part of the sleeve 2 which is shifted (in a direction to the left) to form the upset portion 17.

Figure 2:
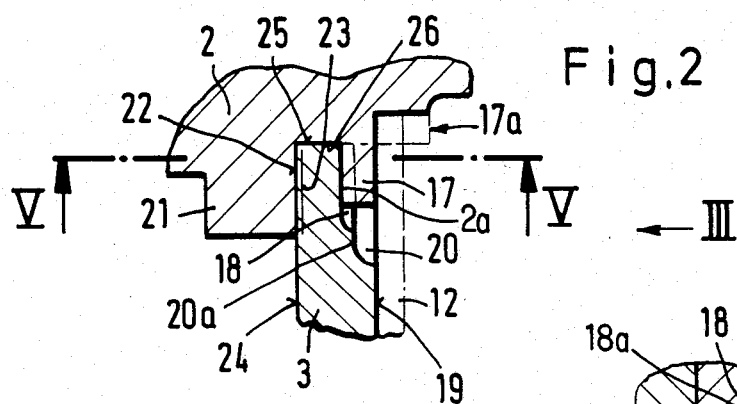
FIG. 2 is an enlarged view of the detail within the circle "X" of FIG. 1.

The means for transmitting torque between the flange 3 and the sleeve 2 comprises a set of elongated protuberances in the form of teeth 18 which extend radially of the flange 3 and are machined or otherwise prefabricated into the end face portion 20a. The teeth 18 do not extend axially beyond the major part of the end face 19, i.e., they are fully received in an annular groove or recess 20 which is machined into or is otherwise formed in the end face 19 and whose deepmost portion is adjacent to the aformentioned portion 20a of the end face 19. This renders it possible to place the friction washer 12 of the friction generating device 9 into direct surface-to-surface contact with the flange 3 (the washer 12 is indicated in FIG. 2 by broken lines). The protuberances or teeth 18 can be formed by rolling, milling, stamping or any other suitable technique. FIG. 2 further shows that the entire upset portion 17 of the sleeve 2 is received in the groove 19 so that its outer side is flush with the major portion of the end face 19 and is contacted by the friction washer 12. In other words, the washer 12 can extend all the way to the cylindrical external surface of the sleeve 2; such external surface is formed in response to shifting of the part 17a in order to form the upset portion 17.

The shoulder 22 of the collar 21 abuts against the radially innermost portion 23 of the end face 24 of the flange 3, and the cylindrical surface surrounding the centrally located opening 25 of the flange 3 surrounds the adjacent cylindrical portion of the external surface 26 of the sleeve 2.

Figure 3:
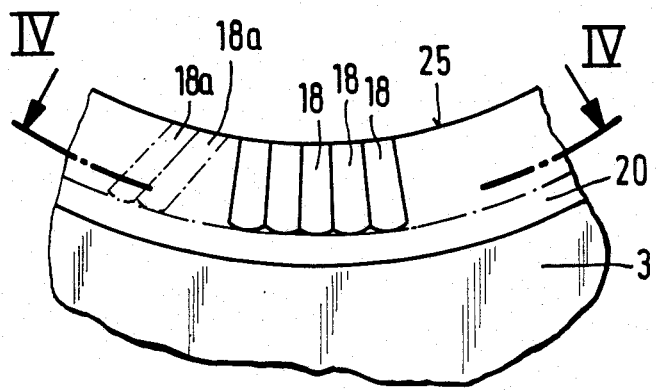
FIG. 3 is a view as seen in the direction of arrow III in FIG. 2.
Figure 4:
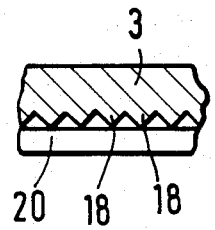
FIG. 4 is a fragmentary sectional view as seen in the direction of arrows from the arcuate line IV—IV of FIG. 3.

As can be seen in FIG. 3, the protuberances or teeth 18 of the flange 3 extend exactly or practically radially of the surface surrounding the opening 25 in the flange 3 i.e., the extensions of top lands or ridges of such teeth can intersect the common axis of the sleeve 2 and flange 3.

Figure 5:
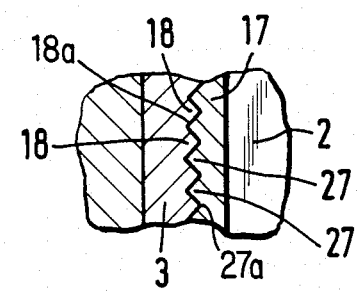
FIG. 5 is a sectional view as seen in the direction of arrows from the line V—V of FIG. 2.

FIG. 5 shows that the upset portion 17 of the sleeve 2 is formed with protuberances or teeth 27 which are complementary to and mate with the teeth 18. The teeth 27 are formed as a result of deformation of the part 17a of the sleeve 2, i.e., as a result of shifting of some material of the sleeve 2 to form the upset portion 17. At such time, the material of the portion 17 is deformed as a result of shifting it from the position 17a to the solid-line position of FIG. 2 and, at the same time, such material is penetrated into by the harder teeth 18 which cause the portion 17 to develop the teeth 27 as well as intervening sockets or tooth spaces 27a for the teeth 18. The entire flange 3 need not be harder than the sleeve 2; it suffices if the material which is immediately adjacent to the exposed surfaces of the radially extending teeth 18 is harder than that part of the upset portion 17 which is to develop the teeth 27 and tooth spaces or sockets 27a for the teeth 18. The teeth 18 define sockets or tooth spaces 18a for the teeth 27.

Figure 6:
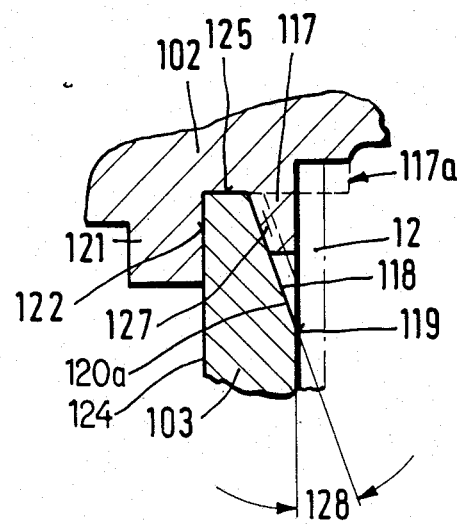
FIG. 6 is a sectional view similar to that of FIG. 2 but showing different protuberances on the upset portion of the male component and in the adjacent end face of the female component.

FIG. 6 shows a portion of a modified structural element including a male component or sleeve 102 and a female component or flange 103. The end face 119 of the flange 103 has a portion 120a which is the frustum of a cone and makes with the major part of the end face 119 an angle 128 of approximately 15 degrees. In other words, the vertex angle of the cone is approximately 150 degrees. The protuberances 118 are radially or substantially radially extending teeth which are provided on the portion 120a of the end face 119 and whose ridges or top lands can be disposed in the plane of the major part of the end face 119. The torque transmitting means including the teeth 119 and the complementary protuberances or teeth 127 on the upset portion 117 of the sleeve 102 is designed in such a way that the outer side of the upset portion 117 is flush with the major part of the end face 119, i.e., the friction washer 12 can be a circumferentially complete body and can extend all the way to the corresponding cylindrical portion of the external surface of the sleeve 102. The teeth 118 form an annulus which is immediately adjacent to the central opening 125 of the flange 103. The reference character 117a denotes the original position of the upset portion 117 of the sleeve 102.

The structural element of FIG. 6 exhibits the advantage that exact upsetting of the portion 117 is less important than the accuracy of upsetting of the portion 17. This is due to the fact that the height of the teeth 118 (as considered radially outwardly from the central opening 125) decreases due to the provision of frustoconical end face portion 120a which enables the material of the portion 117 to flow radially outwardly between the teeth 118 during shifting of the portion 117 from the position 117a to the solid-line position of FIG. 6.

The end face 124 of the flange 103 abuts against the radially extending shoulder 122 of the collar-like portion 121 of the sleeve 102.

The angle 128 can be reduced to 5 degrees or increased to 30 degrees, i.e., the vertex angle of the cone including the surface portion 120a can be between 120 and 170 degrees, preferably between 140 and 160 degrees, and most preferably approximately 150 degrees (as actually shown in FIG. 6). Such selection of the vertex angle facilitates penetration of protuberances or teeth 118 into the material of the upset portion 117 because the material of the portion 117 can readily flow between the teeth 118 in directions substantially radially of the flange 103. Consequently, the protuberances or teeth 227 of the upset portion 117 are truly complementary to the teeth 118.

Figure 7:
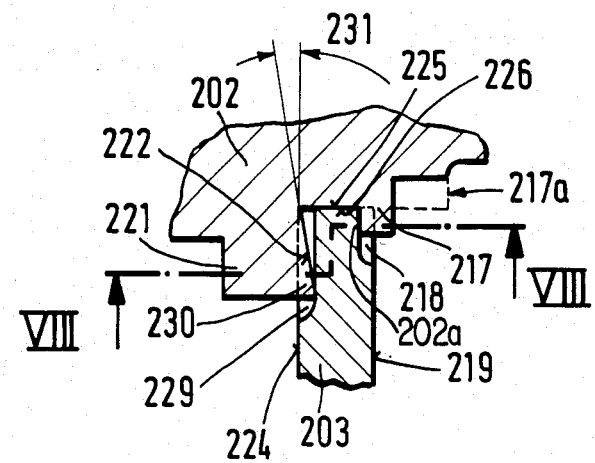
FIG. 7 is a sectional view similar to that of FIG. 2 but showing a female component with two sets of prefabricated protuberances mating with complementary protuberances in the respective shoulders of the male component.
Figure 8:
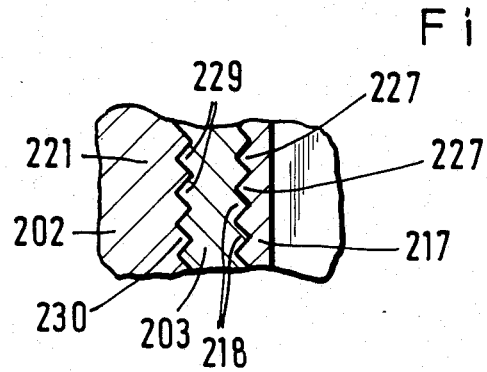
FIG. 8 is a sectional view substantially as seen in the direction of arrows from the line VIII—VIII of FIG. 7.

FIGS. 7 and 8 show a portion of a third structural element including a male component or sleeve 202 and a female component or flange 203. The protuberances of the torque transmitting means between the sleeve 202 and the flange 203 comprise a first set of protuberances or teeth 218 in the end face 219 of the flange, a complementary second set of protuberances or teeth 227 in the shoulder 202a of the upset portion 217 of the sleeve 202, a third set of protuberances or teeth 229 in the end face 224 of the flange 203, and a complementary fourth set of protuberances or teeth 230 in the shoulder 222 of the preferably circumferentially complete collar-like portion 221 of the sleeve 202. The teeth 227 define sockets or tooth spaces for the teeth 218 (and vice versa), and the teeth 230 define sockets or tooth spaces for the teeth 229 (and vice versa). This can be seen in FIG. 8. The teeth 218, 227 and 229, 230 are immediately adjacent to the surface surrounding the central opening 225 of the flange 203. Such surface is closely adjacent to the corresponding cylindrical portion 226 of the external surface of the sleeve 202. The ridge or top lands of the teeth 229 do not extend beyond the major part of the end face 224, and such teeth have penetrated into the material of the portion 221 (to form the teeth 230) prior to or during axial shifting of some material of the sleeve 203 from the position 217a to that shown at 217 in order to form the upset portion and its teeth 227. The ridges or top lands of the teeth 218 do not extend beyond the major part of the end face 219 but a part of the upset portion 217 extends axially beyond the end face 219.

An advantage of the structural element which is shown in FIGS. 7 and 8 is that it can transmit a pronounced torque, i.e. a torque greater than that which can be transmitted by the structural element of FIGS. 1–5 or the element of FIG. 6. This is due to the fact that the torque transmitting means comprises teeth in both end faces of the flange 203 and complementary teeth in both collar-like portions 217, 221 of the sleeve 202.

FIG. 7 shows that the shoulder 222 of the portion 221 is the frustum of a cone which makes with the major part of the end face 224 an angle 231 of approximately five degrees, i.e., the vertex angle of such cone is approximately 170 degrees. The vertex of the cone is on or close to the axis of the flange 203 and to the left of the end face 224 as viewed in FIG. 7. Such configuration of the shoulder 222 facilitates penetration of prefabricated teeth 229 into the portion 221 to form the complementary teeth 230. Furthermore, the material of the portion 221 can readily flow in response to penetration of the teeth 229 so that the thus formed teeth 230 are exactly complementary to the teeth 229, i.e., the portion 221 develops sockets or tooth spaces which receive the teeth 229 without any play. Another advantage of the cooperating teeth 229 and 230 is that the larger portions of teeth 230 are located at a greater distance from the opening 225 than the smaller portions of such teeth, i.e., the teeth 230 are larger and stronger in regions (more distant from the axis of the flange 203) where they are called upon to transmit greater torque.

It is clear that the structural element of FIGS. 7 and 8 can be modified in a number of ways. For example, the torque transmitting means can include only the teeth 229, 203. This allows for a simplification and for a reduction of the cost of the flange 203. The upset portion 217 then merely abuts against a plane (non-serrated) portion of the end face 219.

The conicity of the shoulder 222 can depart from the illustrated conicity. For example, the vertex angle of the shoulder 222 can be anywhere between 160 and 179 degrees but is preferably in the range of 170 degrees (as actually shown in FIG. 7).

Figure 9:
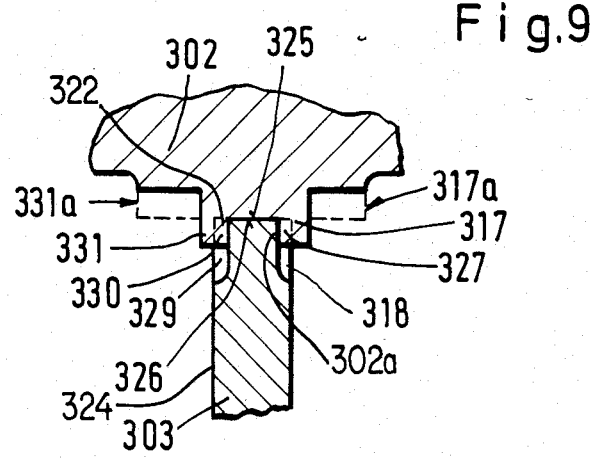
FIG. 9 is a view similar to that of FIG. 2 but showing a modification of the structural element of FIGS. 7 and 8.

FIG. 9 shows a portion of a structural element which constitutes a modification of the element of FIGS. 7 and 8. The main difference is that the teeth 330 (which cooperate with prefabricated teeth 329 in the end face 324 of the flange 303) are formed as a result of upsetting of a portion 331 of the sleeve 302 from the broken-line position 331a to the solid-line position of FIG. 9. This entails the formation of complementary teeth 330 which are immediately adjacent to the opening 325 in the flange 303. The surface surrounding the opening 325 is immediately adjacent to the corresponding cylindrical portion 326 of the external surface of the sleeve 302. The teeth 318 and 327 correspond to the teeth 218 and 227, and the upset portion 317 is obtained as a result of shifting of some material of the sleeve 302 from the broken-line position 317a to the solid-line position of FIG. 9.

The external surface of that part of the sleeve 302 which forms the portion 317 upon completion of the upsetting operation is flush with the cylindrical portion 326 of the external surface of the sleeve 302 so that the flange 303 can be readily slipped onto the sleeve to assume an optimum axial position in which its opening 325 receives the cylindrical portion 326. The same holds true for the parts 17a, 117a and 217a of the sleeves 2, 102 and 202.

The means for upsetting one or more parts of the sleeve in order to ensure that the flange is properly held in a selected axial position and that the components of the improved structural element can transmit torque can be designed in a number of ways. FIGS. 10 to 13 show the construction of one presently preferred apparatus which is used to assemble the structural element of FIGS. 7 and 8.

Figure 10:
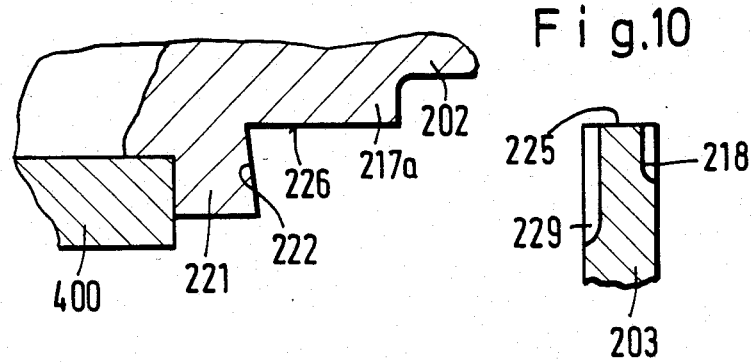
FIG. 10 illustrates the first stage of assembly of a structural element including the male and female components which are shown in FIGS. 7 and 8.
Figure 11:
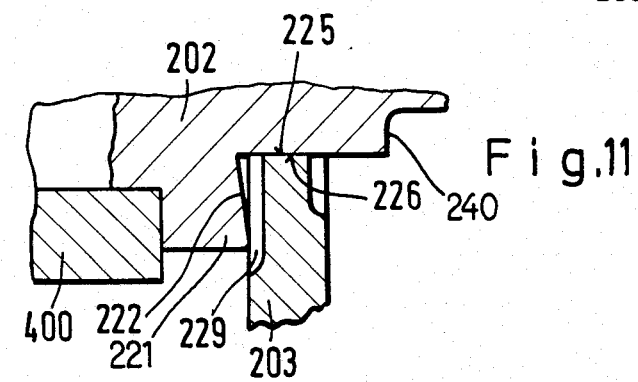
FIG. 11 illustrates the next stage of assembly.

Referring first to FIG. 10, there is shown the sleeve 202 prior to upsetting of the portion 217a, i.e., the flange 203 is remote from the sleeve and the annular portion 221 of the sleeve abuts against a tubular support 440. The flange 203 is provided with prefabricated protuberances or teeth 218 and 229 which are immediately adjacent to the surface surrounding its central opening 225. The cylindrical portion 226 of the external surface of the sleeve 202 is flush with the cylindrical external surface of the part 217a. The support 400 can be fixedly mounted in the frame of the assembling apparatus so that it holds the sleeve 202 against axial movement in a direction to the left, as viewed in FIG. 10.

In the next step (see FIG. 11), the flange 203 is slipped onto the sleeve 202 so that its teeth 229 abut against the frustoconical shoulder 222 of the portion 221. The diameter of the cylindrical portion 226 of the external surface of the sleeve 202 can be slightly smaller than the diameter of the opening 225 so as to allow for unobstructed axial movement of the flange 203 toward and against the portion 221.

Figure 12:
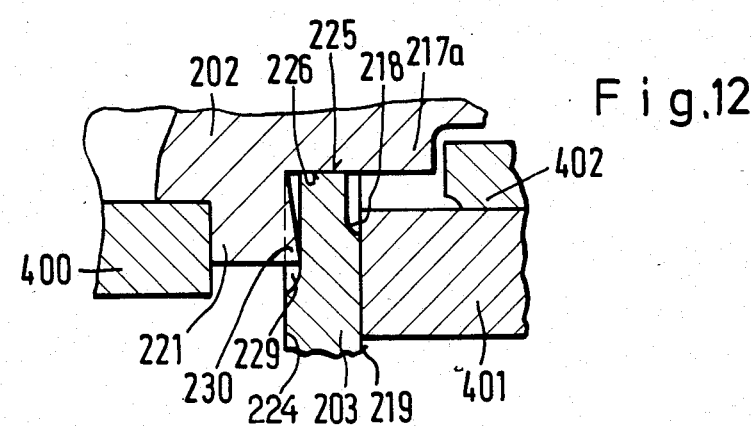
FIG. 12 illustrates a third stage of assembly.

The next assembling step is shown in FIG. 12. The flange 203 is moved axially to the left and/or the sleeve 202 is moved axially to the right so that the teeth 229 in the end face 224 penetrate into the material of the portion 221 (i.e., into the shoulder 222) and form the complementary projections or teeth 230. The material of the portion 221 can flow radially inwardly and/or outwardly to develop the teeth 230 as well as the sockets or tooth spaces for the teeth 229. The means for moving the flange 203 axially beyond the position of FIG. 11 (so as to form the teeth 230) includes an axially movable tool 401 which bears against the end face 219 and moves the end face 224 nearer to the support 400.

Figure 13:
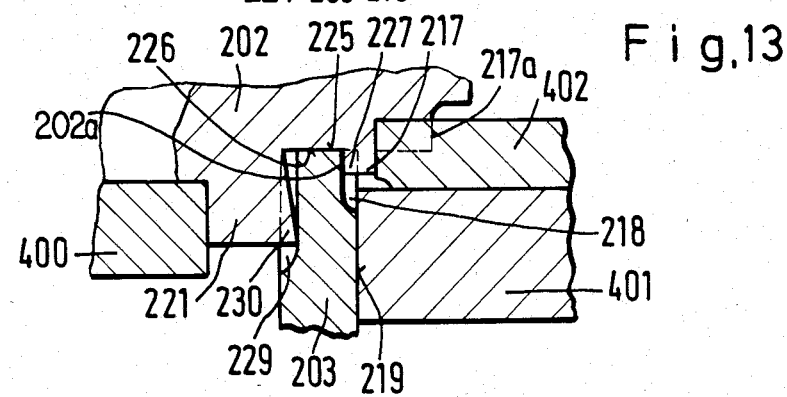
FIG. 13 illustrates a further stage of assembly of the structural element.

The last stage of assembling the element including the components 202, 203 is shown in FIG. 13. The tool 401 is surrounded by an annular deforming member 402 which is caused to move against a radially extending shoulder 240 of the sleeve 202 in order to shift the portion 217 from the position 217a to the solid-line position of FIG. 13 and to thus fix the flange 203 in a predetermined axial position in which the shoulder 222 has a set of fully developed teeth 230 and the left-hand end face (shoulder 202a) of the portion 217 has a set of fully developed teeth 227.

It is further within the purview of the invention to provide the shoulder 222 with a set of prefabricated teeth 230 which come into mesh with the adjacent teeth 229 in response to axial shifting of the flange 203 from the position of FIG. 10 to the position of FIG. 12. This reduces the number of assembling steps but contributes to a somewhat higher cost of the sleeve 202 because the latter must be provided with prefabricated teeth 230. The last step then involves the formation of the upset portion 217 in order to develop the complementary teeth 227 and to fix the flange 203 in an optimum axial position with reference to the sleeve 202. Inversely, the upset portion 217 can be formed on the sleeve 202 prior to application of the flange 203 (from the left-hand axial end of the sleeve) and the portion 221 with its teeth 230 is formed in the next-following step by upsetting a part of the sleeve in order to develop the teeth 230 and to ensure that the flange abuts against the prefabricated portion 217.

It is further possible to provide the shoulder 221 with prefabricated teeth 230 and to use such teeth as a means for forming the end face 224 with complementary teeth 229 in response to axial movement of the flange 203 toward and into the position of FIG. 13.

A further modification is shown in FIG. 3. The protuberances or teeth 18a of the flange 3 do not extend exactly radially but rather tangentially of a circle whose center is located on the axis of the flange 3. Otherwise stated, imaginary extensions of the ridges of teeth 18a bypass the axis of the flange 3. Deviation of the ridges or top lands of teeth 18a from a direction exactly radially toward the axis of the flange 3 can be less pronounced or more pronounced than shown in FIG. 3. In either event, the orientation of teeth 18a is preferably such that their radially outermost portions are located ahead of the radially innermost portions as considered in the direction of arrow Z which denotes the direction of rotation of the flange 3 with the sleeve 2.

The prefabricated protuberances or teeth (such as the teeth 18 or 18a shown in FIG. 3) can be formed by milling, knurling, embossing or any other suitable technique. The material of the component which has prefabricated protuberances is at least slightly harder than the adjacent portion of the other component. At the least, it is advisable to harden that portion of the male and/or female component which is provided with prefabricated protuberances. This ensures that the prefabricated protuberances will cause the adjacent portion of the other component to develop clearly outlined complementary protuberances which cooperate with the prefabricated protuberances to ensure the transmission of the predetermined torque. For example, the material of the component which is provided with prefabricated protuberances can be hardened in a next-following step and soley in the region of the freshly formed prefabricated protuberances. The hardening can involve a thermal treatment known as inductive hardening. An advantage of such treatment is that it can be highly localized, i.e., it merely involves requisite hardening of those parts of a component which are provided with prefabricated protuberances, and the hardening can be felt only in a stratus immediately or closely adjacent to the exposed surface of each protuberance.

It is further possible to combine the improved torque transmitting means with conventional torque transmitting means, e.g., with torque transmitting means disclosed in the aforementioned French Pat. No. 1,096,443 wherein the protuberances are parallel with the common axis of the assembled components. Such a combination of novel and conventional expedients can be utilized when it is necessary or desirable to transmit a highly pronounced torque. The depth of axially parallel protuberances need not be pronounced because such protuberances transmit only a portion of total torque. This is desirable and advantageous because the axially parallel protuberances remove relatively small shavings during axial movement of the flange and sleeve relative to each other. Moreover, such design of axially parallel protuberances ensures that the flange can be slipped onto the sleeve without the development of substantial radial stresses which could adversely affect the transmission of torque and/or the useful life of the structural element. The development of relatively small or negligible radial stresses is due to the fact that the axially extending protuberances of one of the components and the complementary protuberances define clearances or gaps extending between the root diameters of the prefabricated protuberances and the major diameters of the complementary protuberances.

The configuration and/or dimensions of prefabricated protuberances or teeth can be varied in dependency on the magnitude of the torque to be transmitted, on the availability of machinery for the making of such protuberances, and certain other parameters. For example, the protuberances may constitute so-called Hirth-type serrations. All that counts is that the depth of the protuberances extend in the axial direction of the assembled male and female components so that penetration of prefabricated protuberances into the material of the other component need not involve the removal of shavings or otherwise configured particles which would require the provision of a chamber and would be likely to entail the development of pronounced radially oriented stresses.

The portion 26 of the peripheral surface of the sleeve 2 can be a cylinder or it can have a slightly conical shape. The same holds true for the corresponding portions of the sleeves 102, 202 and 302.

An advantage of the improved structural element is that the magnitude of radial stresses which develop during assembly of the male and female components is nil or a minute fraction of those which develop in connection with the assembly of conventional strucural elements. Therefore, the likelihood of development of cracks is very remote and the number of rejects is minimal. Moreover, the improved structural element can transmit greater torques because the safety factor can be reduced due to the absence of hairline cracks and/or other defects.

The flange can be formed with one or two sets of prefabricated protuberances regardless of whether the sleeve is provided with a single upset portion (FIGS. 1–8 and 10–13) or with two upset portions (FIG. 9).

Without further anaylsis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A composite structural element, particularly a hub for a clutch disc for use in a friction clutch of a motor vehicle, comprising an annular female component; a male component extending through said female component and having first and second shoulders flanking said female component to hold said components against axial movements relative to each other, said male component including at least one upset portion which defines one of said shoulders; and means for transmitting torque between said components, including protuberances provided on at least one of said components and extending substantially radially of said female component, and other of said componets having sockets for said protuberances, said sockets and said protuberances cooperating with said shoulders to rigidly connect said componets to each other and to hold said components against angular movement relative to each other and said sockets being defined by portions of said other component which are displaced by and disposed between said protuberances.

2. The element of claim 1, wherein said protuberances include teeth.

3. The element of claim 1, wherein said protuberances include Hirth-type serrations.

4. The element of claim 1, wherein said female component has an opening for said male component and said protuberances are provided on said female component adjacent to said opening.

5. The element of claim 1, wherein said female component has first and second end faces which are respectively adjacent to said first and second shoulders, said protuberances being provided in at least one of said end faces.

6. The element of claim 5, wherein said protuberances are provided in each of said end faces.

7. The element of claim 5, wherein said one shoulder is adjacent to said one end face and said upset portion has complementary protuberances mating with the protuberances of said female component and defining said sockets.

8. The element of claim 7, wherein said complementary protuberances are formed as a result of penetration of protuberances of said female component into the material of said male component during upsetting of said portion of the male component.

9. The element of claim 1, wherein said male component includes first and second upset portions which respectively define said first and second shoulders.

10. The element of claim 1, wherein said protuberances are provided in said first shoulder.

11. The element of claim 10, wherein said upset portion defines said second shoulder of said male component.

12. The element of claim 1, wherein said female component has first and second end faces which are respectively adjacent to said first and second shoulders, said protuberances including prefabricated first protuberances provided in said first end face, said first shoulder having second protuberances mating with said first protuberances and defining first sockets which receive said first protuberances, said protuberances further including third protuberances provided in said second end face and fourth protuberances provided in said second shoulder and mating with said third protuberances, said fourth protuberances defining sockets for said third protuberances and vice versa.

13. The element of claim 12, wherein said third protuberances are prefabricated and said fourth protuberances are formed by said third protuberances as a result of penetration of third protuberances into the second shoulder of said male component.

14. The element of claim 1, wherein said protuberances have ridges making with the axis of said female element angles of between 60 and 85 degrees.

15. The element of claim 1, wherein each of said angles is between 70 and 80 degrees.

16. The element of claim 14, wherein each of said angles is approximately 75 degrees.

17. The element of claim 1, wherein one of said shoulders constitutes the frustum of a cone and said projections are provided in said one shoulder.

18. The element of claim 17, wherein the vertex angle of said cone is between 160 and 179 degrees.

19. The element of claim 17, wherein the vertex angle of said cone is approximately 170 degrees.

20. The element of claim 17, wherein the vertex of said cone is on the axis of said female component.

21. The element of claim 1, wherein said protuberances are elongated and extend substantially tangentially of a circle whose center is located on the axis of said female component.

22. The element of claim 21, wherein said components are arranged to rotate in a predetermined direction and each of said protuberances has a radially innermost portion and a radially outermost portion located ahead of the respective innermost portion, as considered in said direction.

23. The element of claim 1, wherein the material of said protuberances is harder than the material which is adjacent to said sockets.

* * * * *